INVENTOR.
Clifford C. Hach,
BY
Wolfe, Hubbard, Voit & Osann
Attorneys.

3,309,956
EXTENDED RANGE TURBIDIMETER
Clifford C. Hach, Ames, Iowa, assignor to Hach Chemical Company, Ames, Iowa, a corporation of Iowa
Filed July 5, 1962, Ser. No. 207,649
2 Claims. (Cl. 88—14)

This invention relates to instruments for measuring the turbidity of a fluid and concerns, more particularly, a continuous reading turbidimeter for sensing a flowing fluid sample.

Nephelometry, or the principle of light scattering, possesses a number of important advantages when employed for measuring fluid turbidity. This principle depends upon sensing the amount of light which is reflected or scattered by the particles or turbidity when a beam of light is directed into the sample. The advantages of this system include: (1) permitting the use of a strong light source to obtain sensitivity and lower range turbidity sensing, (2) obtaining an output which increases with increasing turbidity so that conventional meters, recorders, etc., can be used, and (3) avoiding the effect of color since dissolved color in the sample does not register.

Heretofore, the light scattering principle was thought to be impractical for measuring very high turbidity since a highly turbid sample would simply absorb a sensing light beam with the result that instruments relying on this principle would become non-responsive. As a practical matter, the light scattering principle of turbidity measurement has previously been restricted to turbidities ranging up to about 500 parts per million.

The primary aim of the present invention is to provide a turbidimeter having the advantages of light scattering operation and which is capable of effectively reading highly turbid fluid samples. In a commercial instrument embodying the invention, an upper turbidity limit of from 5,000 p.p.m. to 10,000 p.p.m. is standard, and the possible upper range is unlimited. As a basis for comparison, river water under flood conditions, which is virtually opaque, has a turbidity of approximately 5,000 p.p.m.

It is also an object of the invention to provide a turbidimeter of the above type which is also quite sensitive and accurate in the low turbidity ranges since it does make use of the light scattering principle of turbidity measurement.

Another object is to provide an instrument as characterized above that is particularly trouble-free in operation and which requires no routine maintenance other than occasional standardization.

Figure 1:
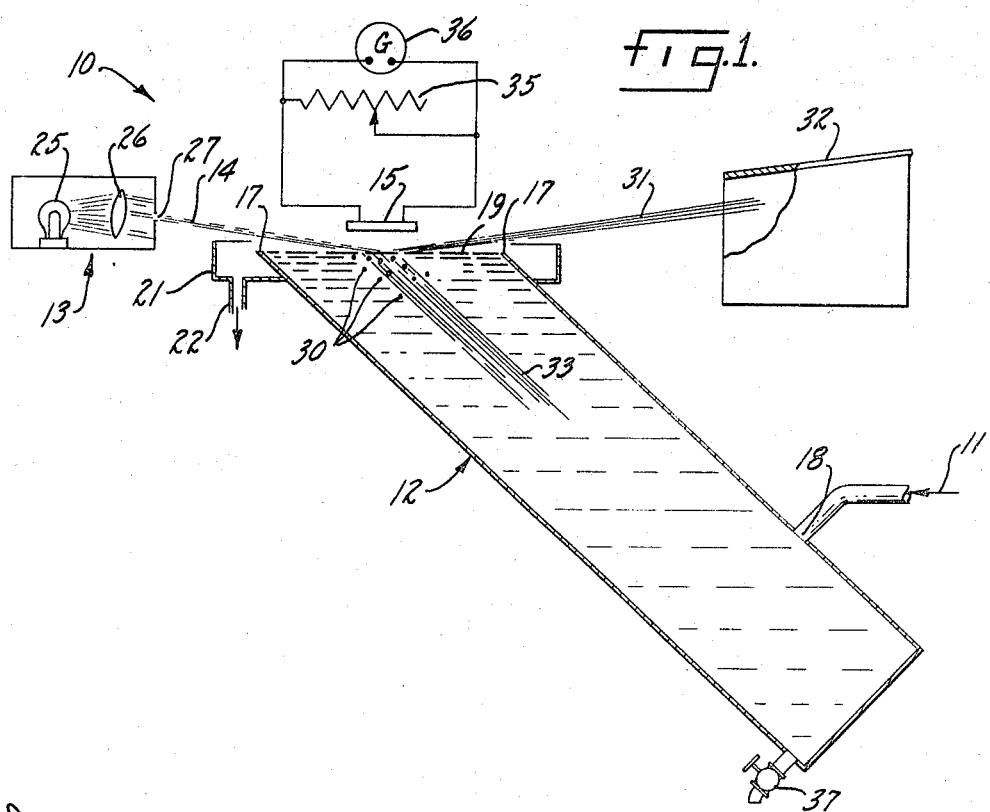
Figure 2:
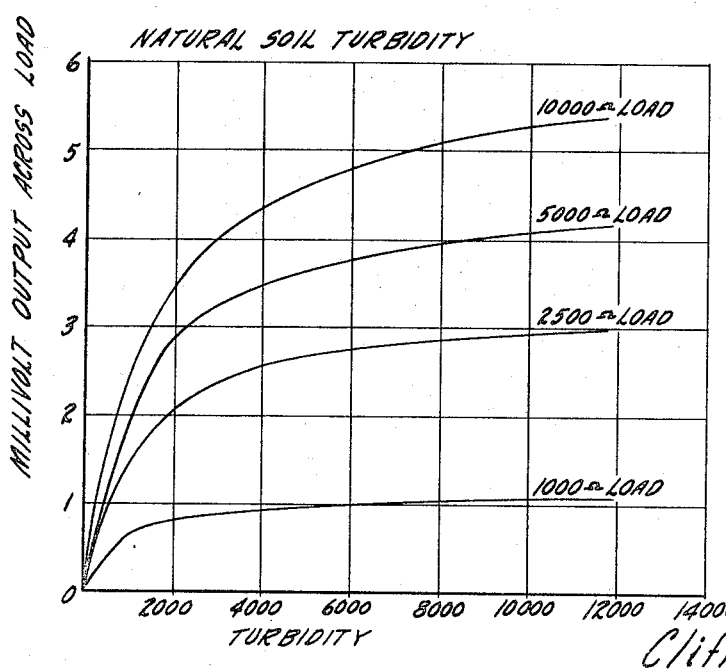

Other objects and advantages of the invention will become apparent upon reading the following detailed description and upon reference to the drawings, in which:

FIGURE 1 is a partially schematic, vertical elevation of a turbidimeter constructed in accordance with the invention; and FIG. 2 is a graphic presentation of the operating characteristics of an instrument of the type shown in FIG. 1.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning now to FIG. 1, there is schematically shown a turbidimeter 10 embodying the invention and arranged to continuously sense the turbidity of a flowing fluid sample whose inflow is indicated by the arrow 11. The turbidimeter includes a fluid sample container 12, a light source 13 for developing a light beam 14, and a light sensitive device which preferably takes the form of a photovoltaic selenium photocell 15 that is hermetically sealed.

The container 12 in the illustrated construction is an elongated cylinder having an open top whose edge portions 17 lie in a substantially horizontal plane. In keeping with the invention, the fluid sample is continuously introduced to the container 12 through an inlet opening 18 positioned well below the open top of the container so that the fluid spills over the edge portions 17 of the open top and maintains a flowing smooth upper fluid surface 19. In a typical practical instrument employing a sample container having a three-inch diameter, a sample flow rate of ½ gallon per minute is entirely satisfactory for developing the proper upper surface 19. For collecting and discharging the fluid spilled from the container 12, an annular trough 21 is disposed about the upper end of the container so as to receive the fluid spilling over the edge portions 17. A drain opening 22 is provided in the trough 21 for coupling the trough to any convenient discharge point.

The preferred light source 13 includes a precision lamp 25 positioned adjacent a condensing lens 26 which directs the light through a shutter opening 27 so that the generated beam 14 is generally rectangular in cross section, having dimensions of approximately ⅛ inch by 1 inch in a typical commercial embodiment, and is defined by generally parallel rays. To insure uniformity of intensity and long lamp life, it is desirable to energize the lamp below its rated voltage through a voltage regulating transformer, not shown.

In accordance with the invention, the light beam 14 is directed against the horizontal fluid surface 19 at a sharply acute angle with respect to the surface, and the photocell 15 is positioned just above the area where the beam strikes the fluid so as to detect light scattering upwardly from turbidity particles 30 at or just beneath the surface 19. Again referring to a practical embodiment, the beam 14 may be disposed at an angle of approximately 5° with respect to the horizontal. A portion 31 of the beam 14 is reflected from the fluid surface 19 well clear of the photocell 15 and is absorbed by a light trap 32. Another portion 33 of the beam 14 is refracted into the fluid but the container 12 is sufficiently large, and disposed so that its elongated dimension parallels the refracted beam portion 33, so that this light is also absorbed. With the beam 14 disposed at approximately a 5° angle from the horizontal, the refracted beam portion 33 will assume an angle of approximately 45° from the horizontal and, hence, the cylindrical container 12 is likewise disposed at a 45° angle.

It will therefore be apparent that the measuring light, that portion of the beam 14 scattered upwardly onto the photocell 15, travels through a very small portion of the fluid sample. The light is scattered virtually at the surface 19 and thus increasing turbidity does not make the instrument non-responsive. In fact, the more turbid the fluid sample, the shorter is the path that the light must follow in the fluid before being reflected up and out of the sample.

To conveniently indicate the amount of light striking the photocell 15, the cell is electrically coupled to a load 35, and a sensitive galvanometer 36 is connected to display the voltage developed across the load 35 by the output of the photocell 15. The output of the cell 15, and thus the voltage indicated by the galvanometer 36, is directly proportional to the amount of scattered light and thus the galvanometer gives a direct reading of the amount of turbidity being sensed.

The chart appearing as FIG. 2 represents exemplary output characteristics of a commercial instrument when measuring natural soil turbidity. As will be apparent, varying the values of the load 35 from 1,000 ohms to 10,000 ohms shifts the range of the millivolt output of the photocell 15 for different amounts of turbidity, calibrated in parts per million. Since the output of the photocell 15 is directly proportional to the turbidity of the sample under test, it will be appreciated that the galvanometer 36 may be replaced by any type of electrically actuated recording or signaling device which might be convenient for the user of the turbidimeter 10.

Standardization of the turbidimeter 10 may be accomplished in the usual manner by introducing a fluid sample of known turbidity, as determined by a standard turbidimeter, and adjusting the value of the load 35 until the desired reading is indicated by the galvanometer 36.

The turbidimeter 10 thus carries all of the advantages of a turbidity measuring instrument operating on the principle of light scattering into the high turbidity ranges where such instruments were though to be entirely unsuitable. Moreover, this objective has been obtained in an instrument of straightforward, reliable design which is quite trouble-free in operation and which requires virtually no maintenance. The flowing fluid surface 19 through which the measuring light is introduced to the sample is "self-cleaning." The photocell 15 is not in contact with the fluid under test and hence does not become fouled. Utilizing a hermetically sealed photocell 15 further insures reliable, trouble-free operation. The only attention which the turbidimeter 10 thus requires is occasional standardization and infrequently, it may be desirable to open a drain 37 positioned at the bottom of the container 12 so as to drain off sludge or heavy material which might settle toward the bottom of the container.

I claim as my invention:

1. A turbidimeter comprising, in combination, a lamp, a lens and shutter positioned adjacent said lamp for directing a narrow beam of light at a sharply acute angle substantially less than 45° with respect to the horizontal, an elongated fluid sample container, said container having an open top whose edge portions lie in a substantially horizontal plane, said means including an inlet opening in said container for introducing fluid below said open top so that fluid will spill over said edge portions and maintain a flowing smooth upper fluid surface in the container, a trough for collecting and discharging fluid spilled over said edge portions, said container being angled so that said light beam strikes said fluid surface and the elongated dimension of the container parallels the portion of said beam that is refracted into the fluid, and a light sensitive device positioned closely above the area where said beam strikes said fluid and just out of said light beam for detecting light scattered upwardly from particles at or just beneath said surface.

2. A turbidimeter comprising, in combination, a lamp, a lens and shutter positioned adjacent said lamp for directing a narrow beam of light at a sharply acute angle substantially less than 45° with respect to the horizontal, an elongated fluid sample container, means for maintaining a flowing smooth upper fluid surface in the container, said container being angled so that said light beam strikes said fluid surface and the elongated dimension of the container parallels the portion of said beam that is refracted into the fluid, a light trap positioned to absorb the portion of said beam reflected from said surface, said container being sufficiently elongated to cause absorption of the portion of said beam refracted into said fluid, a light sensitive device positioned closely above the area where said beam strikes said fluid and just out of said light beam for detecting light scattered upwardly from particles at or just beneath said surface, and means for indicating the output of said device and thus the turbidity of said sample.

References Cited by the Examiner

UNITED STATES PATENTS

| | | | |
|---|---|---|---|
| 1,648,369 | 11/1927 | Svedberg et al. | 88—14 |
| 2,280,993 | 4/1942 | Barnes | 88—14 |
| 2,451,501 | 10/1948 | Liben | 88—14 |
| 2,584,583 | 2/1952 | Hillery | 88—14 |
| 3,065,665 | 11/1962 | Akhtar et al. | 250—218 X |

FOREIGN PATENTS 463,391　2/1950　Canada.

JEWELL H. PEDERSEN, *Primary Examiner.*

T. L. HUDSON, O. B. CHEW, *Assistant Examiners.*